US012340336B2

(12) United States Patent
Tartal et al.

(10) Patent No.: US 12,340,336 B2
(45) Date of Patent: Jun. 24, 2025

(54) ROBOTIC DELIVERY SYSTEM

(71) Applicant: UNITED STATES POSTAL SERVICE, Washington, DC (US)

(72) Inventors: William A. Tartal, Baltimore, MD (US); Gabriel M. Yessin, Arlington, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 17/353,168

(22) Filed: Jun. 21, 2021

(65) Prior Publication Data

US 2021/0398058 A1    Dec. 23, 2021

Related U.S. Application Data

(60) Provisional application No. 63/042,067, filed on Jun. 22, 2020.

(51) Int. Cl.
*G06Q 10/083*    (2024.01)
(52) U.S. Cl.
CPC ................. *G06Q 10/083* (2013.01)
(58) Field of Classification Search
CPC .......... G06Q 10/083; G06Q 10/0836
See application file for complete search history.

(56) References Cited

U.S. PATENT DOCUMENTS

| 10,604,344 | B2* | 3/2020 | Testa | G07F 11/165 |
| 2019/0095862 | A1* | 3/2019 | Kilzer | G05D 1/0088 |
| 2020/0250614 | A1* | 8/2020 | Zhu | G07C 9/00571 |

OTHER PUBLICATIONS

PYMNTS, "Zara Introduces Robots To Speed Up Online Order Pickup," Mar. 5, 2018, pymnts.com, retrieved from https://www.pymnts.com/news/retail/2018/zara-warehouse-robots-order-pickup/ (Year: 2018).*

* cited by examiner

*Primary Examiner* — Rupangini Singh
*Assistant Examiner* — Bryan J Kirk
(74) *Attorney, Agent, or Firm* — MH2 Technology Law Group, LLP (57) ABSTRACT

Techniques for automatically providing a package for pickup are presented. The techniques can include: receiving, at a publicly-accessible terminal, a code associated with the package; validating the code with data in a database communicatively coupled to the terminal; retrieving, by a robot communicatively coupled to the publicly-accessible terminal, the package from a publicly-inaccessible package staging site; delivering, by the robot, the package to a customer interface repository; obtaining confirmation that the package has been removed from the customer interface repository; and storing data, by at least one server, indicating the package has been removed.

20 Claims, 10 Drawing Sheets

FIG. 10

ROBOTIC DELIVERY SYSTEM

RELATED APPLICATION

This application claims priority to, and the benefit of, U.S. Provisional Patent Application No. 63/042,067, entitled "Robotic Delivery System", and filed Jun. 22, 2020, which is hereby incorporated by reference in its entirety.

FIELD

This disclosure relates generally to package delivery.

BACKGROUND

In general, delivering a package may involve leaving the package outside of a house or apartment, for example, if the intended recipient is not home. However, this situation is sub-optimal due to exposure to the elements and the possibility of package theft. Keeping the package at a distribution center for customer pickup may also be sub-optimal, as such centers have may have inconvenient hours of operation, require waiting in line, or the like.

SUMMARY

According to various embodiments, a method of automatically providing a package for pickup is presented. The method includes receiving, at a publicly-accessible terminal, a code associated with the package; validating the code with data in a database communicatively coupled to the publicly-accessible terminal; retrieving the package, by a robot communicatively coupled to the publicly-accessible terminal, from a publicly-inaccessible package staging site; delivering the package, by the robot, to a customer interface repository; obtaining confirmation that the package has been removed from the customer interface repository; and storing data, by at least one server, indicating the package has been removed.

Various optional features of the above embodiments include the following. The method may further include, prior to the receiving the code associated with the package: determining a deposit location within the package staging site that is unoccupied; providing, at the robotic delivery system computer, an identification of the deposit location within the package staging site; receiving confirmation, at the robotic delivery system computer, that the package has been deposited at the deposit location within the package staging site; and sending electronically a notification that the package is available for pick up. The method may further include, prior to the receiving the code associated with the package, and at a location different from a location of the publicly-accessible terminal: receiving, at a second publicly-accessible terminal, a second code associated with the package; validating, by the at least one server, the second code; delivering a prompt, by the second publicly-accessible terminal, to deposit the package; determining that the package has been deposited at a second customer interface repository; and storing data, by the at least one server, indicating the package has been accepted. The method may further include transferring, by a second robot at the location different from the location of the publicly-accessible terminal, the package to a delivery staging location. The method may further include: receiving, at the robotic delivery system computer, an indication of an intent to remove a second package from the package staging site; providing, at the robotic delivery system computer, an identification of a second deposit location within the package staging site; receiving confirmation, at the robotic delivery system computer, that the second package has been removed from the second deposit location within the package staging site; and sending electronically a notification that the package has been removed from the second deposit location. The robot may be installed on a track that provides positions of access to the customer interface repository and to the deposit location. The package staging site may include a plurality of deposit locations for each of a plurality of packages. The receiving the code associated with the package may include scanning a barcode. The customer interface repository may include a channel through a wall separating the package staging site from the publicly-accessible terminal. The package may be provided to an autonomous delivery device.

According to various embodiments, a system for automatically providing a package for pickup is presented. The system includes a publicly-accessible terminal configured to receive a code associated with the package; at least one electronic processor communicatively coupled to the terminal and configured to validate the code with data in a database communicatively coupled to the publicly-accessible terminal; a robot communicatively coupled to the publicly-accessible terminal and configured to retrieve the package from a publicly-inaccessible package staging site and deliver the package to a customer interface repository, wherein the at least one electronic processor is further communicatively coupled to the robot, and wherein the at least one electronic processor is further configured to obtain confirmation that the package has been removed from the customer interface repository; and at least one server communicatively coupled to the at least one electronic processor and configured to store data indicating the package has been removed.

Various optional features of the above embodiments include the following. The system may further include a robotic delivery system computer configured to, prior to the receiving the code associated with the package, determine a deposit location within the package staging site that is unoccupied, provide an identification of the deposit location within the package staging site, receive confirmation that the package has been deposited at the deposit location within the package staging site, and send electronically a notification that the package is available for pick up. The system may further include a second publicly-accessible terminal configured to receive, prior to the publicly accessible terminal receiving the code associated with the package, a second code associated with the package, wherein the second publicly-accessible terminal is at a location different from a location of the publicly-accessible terminal; wherein the at least one electronic processor is configured to validate the second code; wherein the second publicly-accessible terminal is further configured to deliver a prompt to deposit the package; wherein the system further comprises at least one sensor configured to determine that the package has been deposited at a second customer interface repository; and wherein the at least one server is further configured to store data indicating the package has been accepted. The system may further include a second robot at the location different from the location of the publicly-accessible terminal configured to transfer the package to a delivery staging location. The robotic delivery system computer may further be configured to receive an indication of an intent to remove a second package from the package staging site, provide an identification of a second deposit location within the package staging site, receive confirmation that the second package has been removed from the second deposit location within the package staging site, and send electronically a notification that the package has been removed from the second deposit location. The robot may be installed on a track that provides positions of access to the customer interface repository and to the deposit location. The package staging site may include a plurality of deposit locations for each of a plurality of packages. The publicly-accessible terminal may include a barcode scanner configured to obtain the code associated with the package. The customer interface repository may include a channel through a wall separating the package staging site from the publicly-accessible terminal. The package may be provided to an autonomous delivery device.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide a robotic package delivery system installed inside a secure area of a post office or other building. The robotic delivery system securely stores and delivers packages through a self-service interface to their intended recipients, who may access the system from an indoor or outdoor customer service area according to various embodiments. Customers may access the robotic delivery system and obtain packages via the customer service area 24 hours a day. According to some embodiments, upon the system receiving a valid pickup barcode, a robot within the secure area retrieves a customer's package and delivers it by way of a secure through-wall interface. Some embodiments also facilitate the induction of customer packages to a collection bin inside of the secure area. According to such embodiments, the robotic delivery system may immediately provide a confirmation receipt and send appropriate tracking information. These and other features and advantages are described in detail herein.

Figure 1:
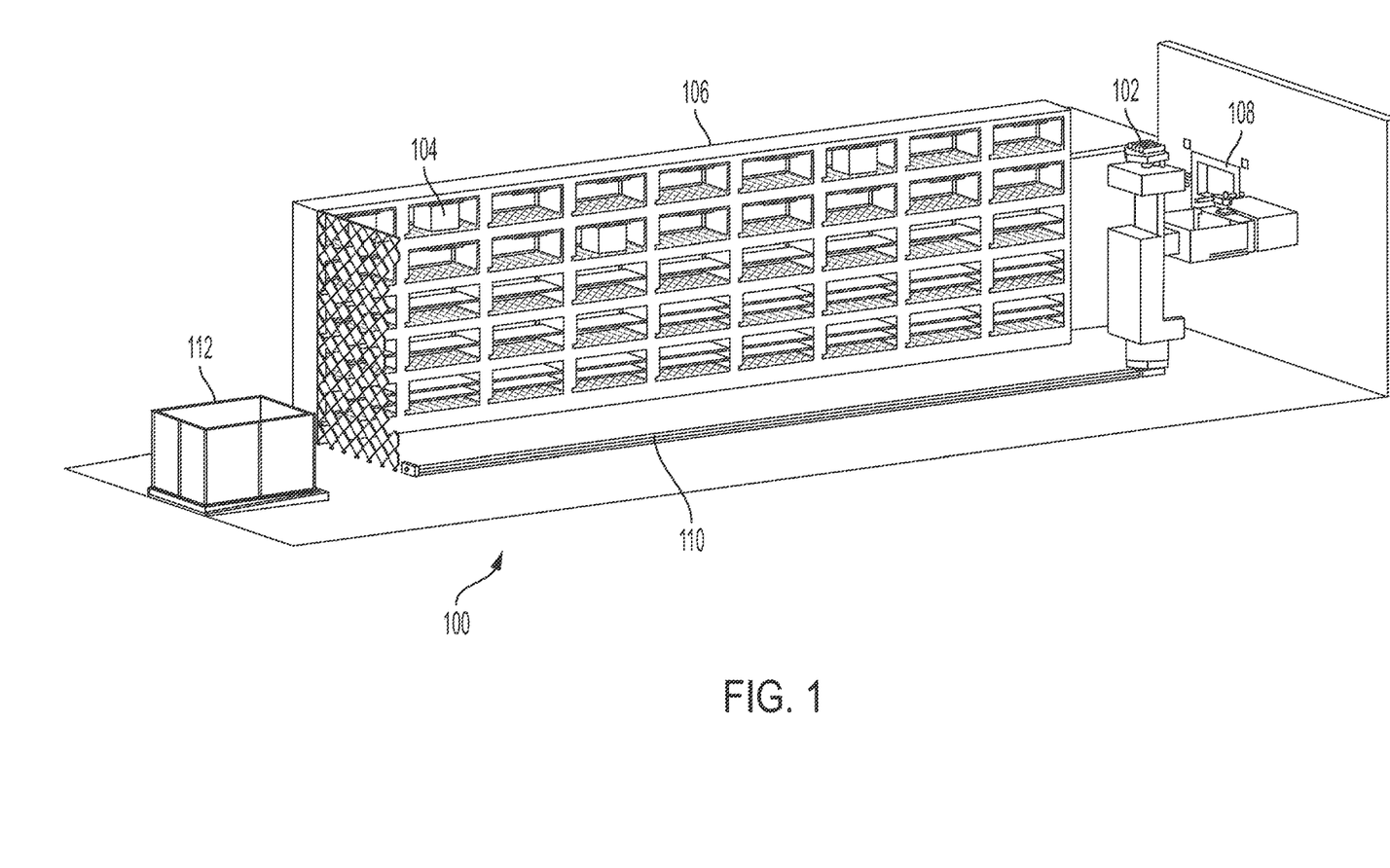
FIG. 1 is a three-dimensional conceptual model of a secure area of a robotic delivery system according to various embodiments.

FIG. 1 is a three-dimensional conceptual model of a secure area 100 of a robotic delivery system according to various embodiments. The secure area 100 shown may be installed at a post office or in a retail location, such as an enclosed mall or strip mall, according to various embodiments. The secure area 100 may be separated from public areas by locked doors. The secure area 100 includes robot 102 and publicly-inaccessible package staging site 106 for holding packages, such as package 104. Package staging site 106 may include a plurality of discrete deposit locations, e.g., pigeonholes, which may be on a plurality of levels. Robot 102 may move between the package staging site 106 and customer interface repository 108. Customer interface repository 108 may include a channel through a wall separating the secure area, which is publicly-inaccessible, from the publicly-accessible area, in which customers may pick up and deposit packages.

Robot 102 may pick up or otherwise acquire package 104 from a deposit location within package staging site 106 and deliver it to a customer through customer interface repository 108. Similarly, robot 102 may accept a package from a customer at customer interface repository 108 and place it into one of the deposit locations within package staging site 106 or some centralized deposit location. Robot 102 may be installed on a fixed track, such as track 110, allowing it to move between customer interface repository 108 and package staging site 106. Alternately, robot 102 may be free-roaming, e.g., on wheels or treads, with access to both customer interface repository 108 and package staging site 106. The secure area 100 further includes delivery staging location 112, which may be in the form of a bin. Robot 102 is further able to move between customer interface repository 108 and delivery staging location 112, e.g., on track 110 or on wheels or treads.

The robotic delivery system may also include a publicly-inaccessible back office terminal included inside of the secure location (or a different robotic delivery system computer, as described below in reference to 202 of FIG. 2), a publicly-accessible customer terminal located outside of the secure area and proximate to customer interface repository 108, and a backend server, which may be located remote from the back off terminal and the customer terminal. All such terminals and computers may be communicatively coupled. The secure area 100 may further include wall, fence, or the like, for preventing agents from coming in close proximity to the robot 102, especially during operation.

According to some embodiments, customer service repository 108 is configured with a safety interlock that disables the system on the customer side (e.g., locks the door) so that robot 102 cannot access package as customers are loading or unloading them. The safety interlock may be implemented at a data level, e.g., system 100 may be notified ahead of time which package a customer is going to deposit or remove, so that robot 102 will not attempt to access it. Alternately, total disabling might be utilized for a higher level of safety. Further, according to some embodiments, the robotic delivery system is configured with other safety interlocks that disable the system, e.g., when the agent is interacting with the system.

According to alternate embodiments, the agent may load and unload packages through the same interface as the customer. This is advantageous because it minimizes extra hardware and also simplifies loading and unloading procedures.

Figure 2:
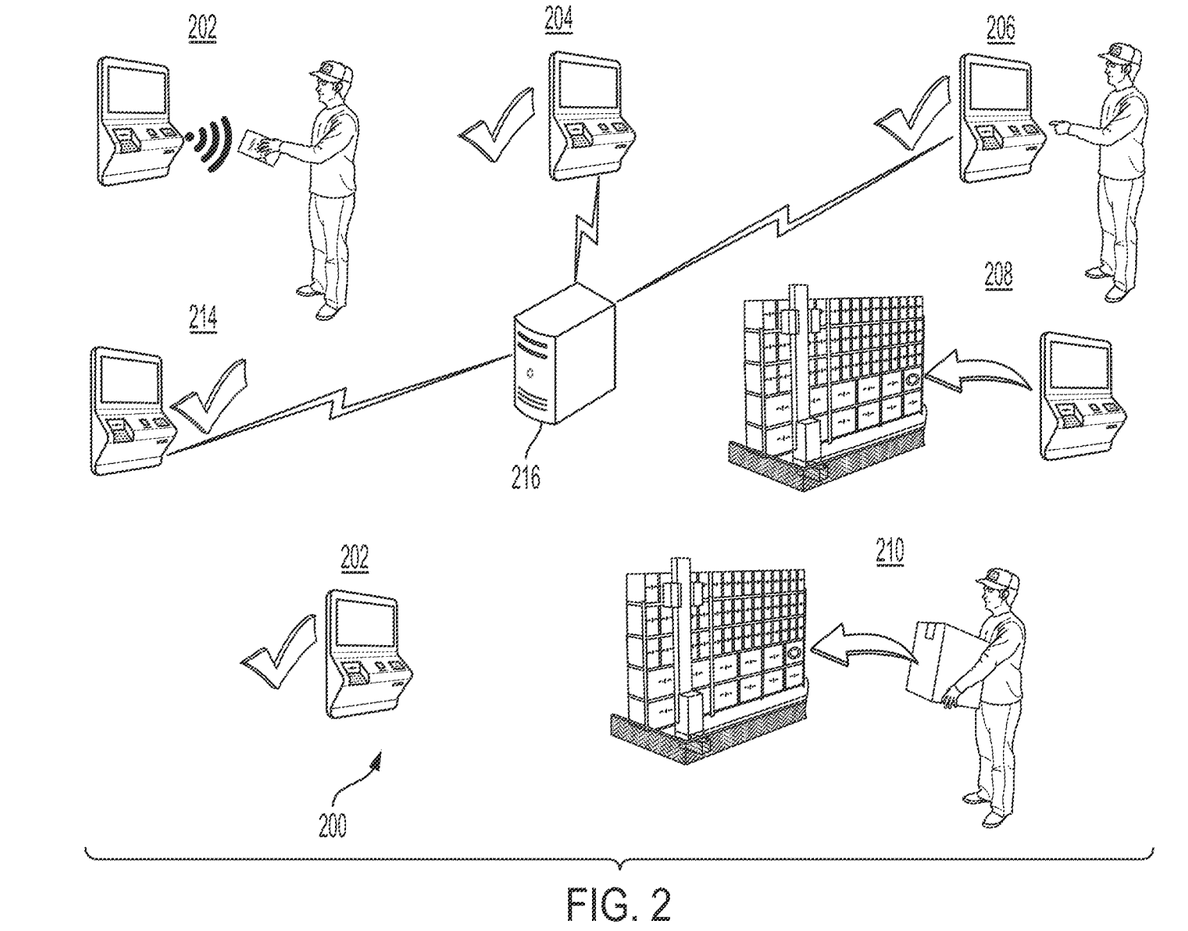
FIG. 2 is an operational diagram of a technique for agent deposition of a package to the robotic delivery system according to various embodiments.

FIG. 2 is an operational diagram of a technique 200 for agent deposition of a package to the robotic delivery system according to various embodiments. Technique 200 may be implemented in part by a robotic delivery system a part of which is shown and described in reference to FIG. 1. The technique may be used by, for example, an agent of the post office or other delivery service to enter a package into the robotic delivery system for delivery to the intended recipient. For example, the agent may obtain the package at a local delivery hub and enter it into the robotic delivery system for its "last mile" to the intended recipient.

At 202, the agent logs in to a computer of the robotic delivery system. Such a computer may be communicatively coupled to, or otherwise in communication with, the robotic delivery system. The robotic delivery system computer may be embodied in any of a variety of devices. For example, the agent may log in at a back office terminal, which may be located in a publicly-inaccessible area such as the secure area shown and described above in reference to FIG. 1. Alternately, the agent may log into a publicly-accessible customer terminal as shown and described below in reference to FIGS. 3, 4, and 6-9. In such embodiments, the publicly-accessible customer terminal may additionally serve as a back office terminal once an authorized agent logs in. Alternately, the agent may log into a mobile device, such as a computerized handheld scanner (e.g., a Mobile Delivery Device, or "MDD", or a smart phone). In general, the robotic delivery system computer may be in the form of a publicly-accessible terminal, a publicly-inaccessible terminal, or a mobile device.

At 204, the robotic delivery system validates the agent's credentials. To do so, the robotic delivery system computer may convey the agent's credentials, or a representation thereof, to a backend server(s) 216, which compares the entered credentials to a stored representation thereof in its records.

At 206, the agent indicates to the robotic delivery system computer that they wish to enter a package into the robotic delivery system. The agent may supply package identification information, e.g., a numeric code, an alphanumeric code, a barcode, or a number represented by a barcode, at this stage. For example, a barcode may have been affixed to the package when it entered the system of the delivery service. Further, backend server(s) 216 may store tracking information for the package to which the barcode is affixed.

According to some embodiments, the customer interface repository, or an area around it, is equipped with sensors for reading the barcode (or other code). Such sensors may include either or both of long-range and wide-view optical sensors that are able to scan the barcode (or other code) as the package is inserted.

At 208, the robotic delivery system identifies a package deposit location within the package staging site that is empty and that may accept the package. The robotic delivery system computer then displays an identification of the deposit location to the agent.

At 210, the agent manually places the package into the deposit location identified by the robotic delivery system computer. This action may include the agent setting the package on a shelf of an identified pigeonhole.

At 212, the agent confirms to the robotic delivery system computer that the package has been deposited. The agent may do so by activating a virtual button or other user interface to indicate that the package has been so deposited, which may provide confirmation to the system that the package is in the deposit location. Alternately, the robotic delivery system may confirm deposit automatically, e.g., using a sensor that provides an indication of whether or not a package is present. Such a sensor may be a weight sensor, a light sensor, a sound sensor, etc., or a combination of sensors, and may be communicatively coupled to the robotic delivery system computer to indicate that the package has been properly deposited.

At 214, the robotic delivery system computer sends a message to backend server(s) 216 indicating that the package is available for customer pickup. Backend server(s) 216 may then take actions such as sending a pick-up notification alerting the intended recipient of the package, e.g., by text message, email, or automated phone message.

Figure 3:
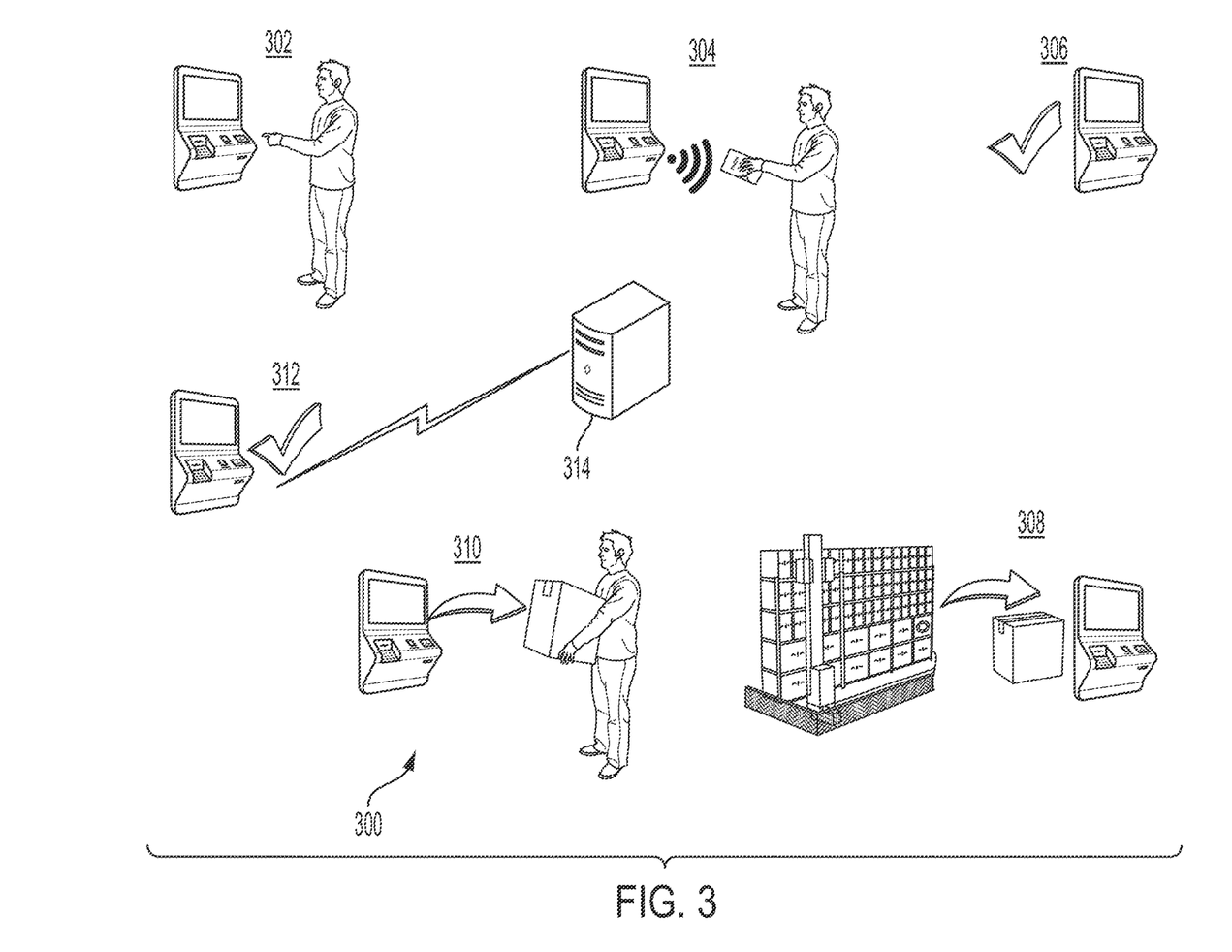
FIG. 3 is an operational diagram of a technique for customer removal of a package from the robotic delivery system according to various embodiments.

FIG. 3 is an operational diagram of a technique 300 for customer removal of a package from the robotic delivery system according to various embodiments. Technique 200 may be implemented in part by a robotic delivery system, an example part of which is shown and described in reference to FIG. 1. The technique 300 may be implemented in part by robotic delivery system 100 of FIG. 1. The technique 300 as described includes actions performed by a customer that is an intended recipient of the package.

At 302, the customer selects an option to receive a package using a touchscreen or other interface on a publicly-accessible customer terminal, which is situated proximate to the publicly-accessible end of the through-wall customer interface repository. The selection may be accomplished by activation of a real button or virtual button on a touchscreen, by way of non-limiting examples.

At 304, the customer enters a package code, e.g., by scanning a barcode (or other code) corresponding to the package using a scanner coupled to the customer terminal or by manually entering the barcode number (or other code) through a keypad or touch screen of the customer terminal. The same barcode may be affixed to the package for tracking purposes according to some embodiments. According to alternative embodiments, the barcode corresponding to the package is a separate barcode from the tracking barcode. In either case, the barcode (or other code) corresponding to the package may be affixed to the package by an agent during loading.

At 306, the robotic delivery system validates the package code with the local database of the robotic delivery system. To do so, the robotic delivery system confirms that the package associated with the package code is available for pickup at the present location by checking its database records, e.g., in a local database and/or backend server(s) 314.

At 308, the robotic delivery system retrieves the customer's package from the package staging site within the secure area and delivers or places it in the customer interface repository. This may be accomplished by the robot of the robotic delivery system, whether on rails or moving freely, picking up the package from the package staging site and delivering it through the publicly-inaccessible side into the customer interface repository. At that point, a lock or interlock may release, allowing the customer to access the package through the interface.

At 310, the customer physically removes their package from the customer interface repository through the publicly-accessible side. The customer may confirm the removal of the package, e.g., by activating a confirmation virtual button on the nearby customer terminal, closing a door to the system, or by some other technique that allows the system to obtain confirmation that the package has been removed. In some embodiments, package removal may be automatically detected or confirmed by the system. For example, according to some embodiments, the customer interface repository, or an area around it, is equipped with sensors for reading the barcode. Such sensors may include either or both of long-range and wide-view optical sensors that are able to scan the barcode as the package is removed. Upon removal, the customer side may close and lock. According to some embodiments, the door on the publicly-accessible side may be configured with a spring or other technique for ensuring that it closes after the customer removes the package.

At 312, the robotic delivery system communicates from the customer terminal to the backend server(s) 314 that the package has been picked up. Backend server(s) 314 may update tracking information for the package and/or store data indicating removal of the package accordingly.

Note that, according to some embodiments, the actions performed by the customer may instead be performed by an autonomous delivery vehicle, e.g., a terrestrial or airborne drone. Such an autonomous delivery vehicle may communicate with the robotic delivery system using an interface separate from the customer terminal. Such an interface may be via radio frequency signals, for example.

Figure 4:
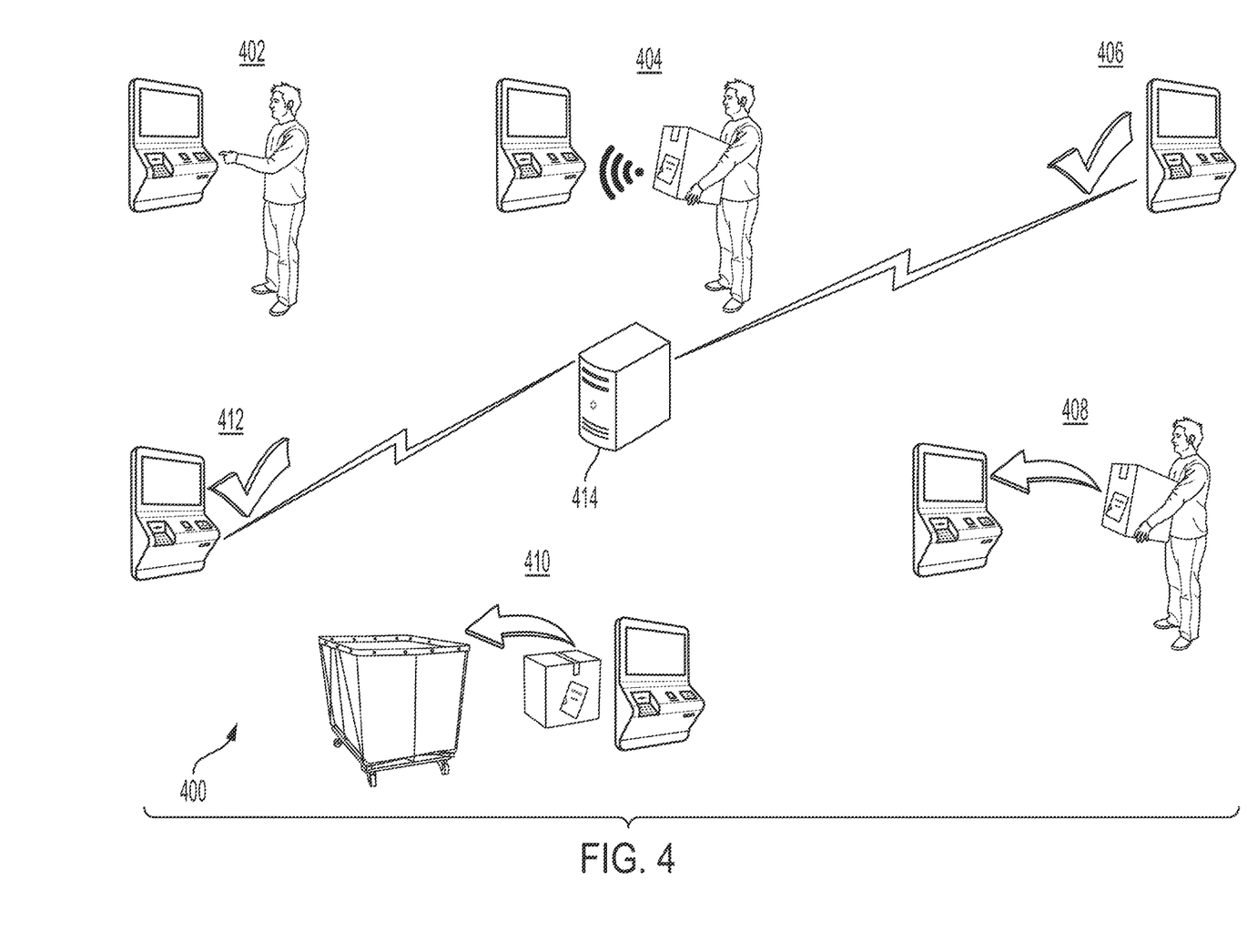
FIG. 4 is an operational diagram of a technique for customer deposition of a package to the robotic delivery system according to various embodiments.

FIG. 4 is an operational diagram of a technique 400 for customer deposit of a package into the robotic delivery system according to various embodiments. Technique 400 may be implemented in part by a robotic delivery system, an example part of which is shown and described in reference to FIG. 1. The technique 400 may involve actions of a customer who wishes to enter a package into the robotic delivery system for delivery to an intended recipient. The package, once accepted into a publicly-inaccessible area of a first robotic delivery system location, e.g., in a first town, may be delivered to a publicly-inaccessible area of a second robotic delivery system location, e.g., in a second town, via standard techniques used by package delivery services for delivery to the intended recipient via the robotic delivery system.

At 402, the customer selects an option to deposit a package via a publicly-accessible customer terminal at a robotic delivery location. As in FIG. 3, the customer terminal is situated proximate to the publicly-accessible side of the through-wall customer interface repository. The selection may be accomplished by activation of a real button or virtual button on a touchscreen, for example.

At 404, the customer provides a package code to the system, for example, by scanning a barcode on the package using a barcode scanner coupled to the customer terminal, or typing the barcode number (or other code) using a keypad or touchscreen. Alternately, according to some embodiments, the customer interface repository, or an area around it, is equipped with sensors for reading the barcode. Such sensors may include either or both of long-range and wide-view optical sensors that are able to scan the barcode as the package is nearby. The customer may have acquired the barcode and/or barcode number from the system itself or from any of a variety of channels, such as via a postal meter device, in an email, or via text message. The barcode may be associated with tracking the package.

At 406, the robotic delivery system validates the barcode number (or other code) with the backend server(s) 414. To do so, the robotic delivery system may confirm that the package associated with the barcode is in the system (and/or the delivery fee has been paid) by checking its database records.

At 408, the customer terminal prompts the customer to deposit or insert the package through the publicly-accessible end of the customer interface repository. The prompt may be delivered via a visual indication on the screen of the customer terminal.

At 410, the robotic delivery system determines whether or not the package is present in the customer interface repository and proceeds to transfer or deposit it at a delivery staging location, which may include a bin according to various embodiments. To transfer the package to the delivery staging location, the robot of the robotic delivery system may convey the package from the customer interface repository to the delivery staging location.

At 412, the robotic delivery system sends a package deposition message to the backend server(s) 414 indicating that the package has entered the system. The backend server(s) may accordingly store data indicating the package has been accepted, which can include updating tracking information for the package and/or notifying an agent that a package is ready for pickup.

Figure 5:
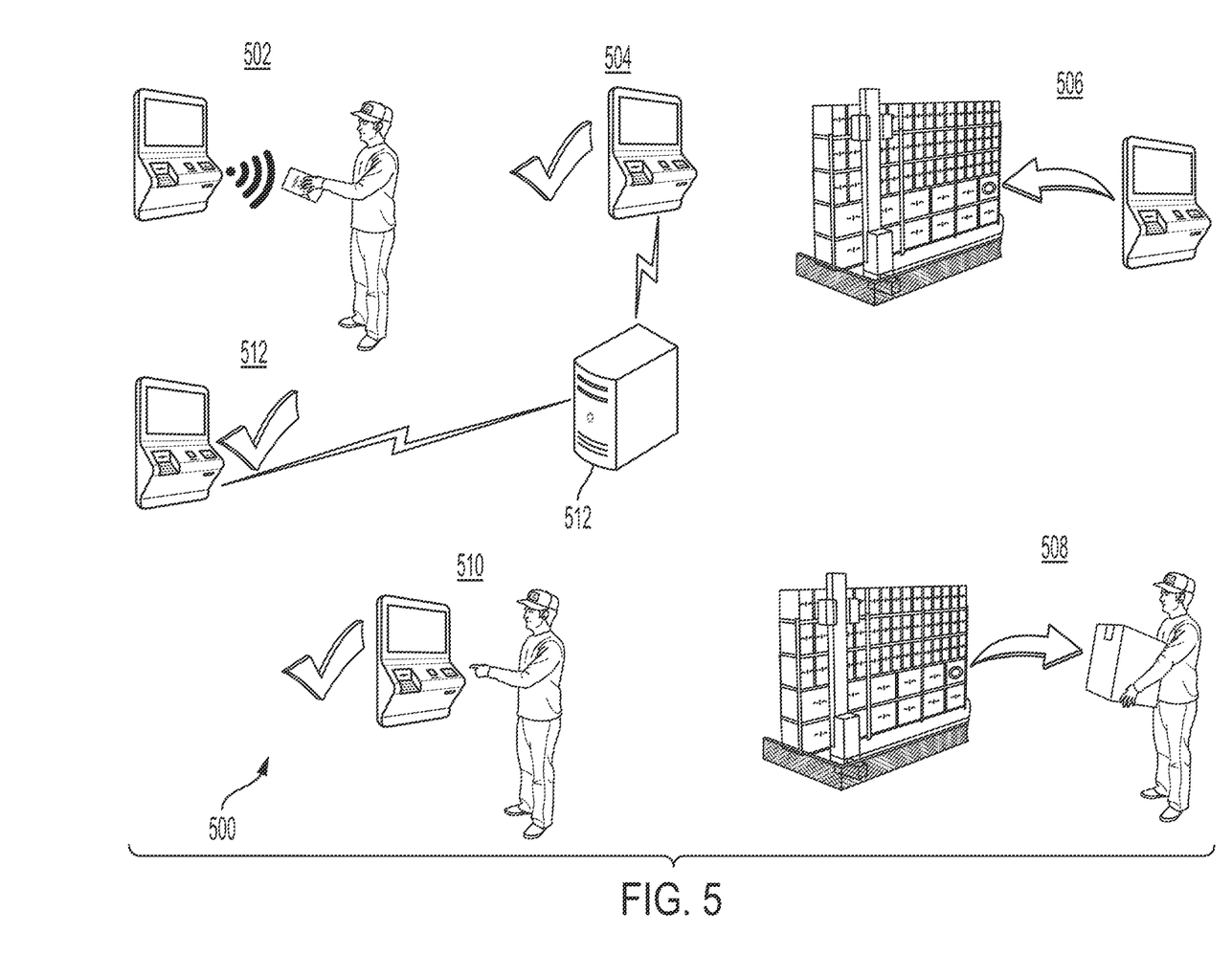
FIG. 5 is an operational diagram of a technique for agent removal of a package from the robotic delivery system due to time expiration according to various embodiments.

FIG. 5 is an operational diagram of a technique 500 for agent removal of a package from the robotic delivery system due to time expiration according to various embodiments. Technique 500 may be implemented in part by a robotic delivery system, an example part of which is shown and described in reference to FIG. 1. The technique 500 may be implemented when a package has been in a deposit location within the package staging site for longer than a predetermined time period, e.g., any number of days between three and fifteen, inclusive. Alternatively, or in addition, the technique 500 may be implemented when space is needed in the package staging site for new incoming packages.

At 502, an agent logs into the robotic delivery system at a robotic delivery system computer, which may be implemented as or on a publicly-accessible terminal, a publicly-inaccessible terminal, or a mobile device or the like. The actions of 502 are essentially identical to those of 202 of FIG. 2.

At 504, the robotic delivery system validates the agent's login credentials. The actions of 504 are essentially identical to those of 204 of FIG. 2.

At 506, the agent provides the robotic delivery system with an indication of intent to remove a package, e.g., by selecting an option to remove a package with the robotic delivery system computer. This action may include the agent scanning a barcode associated with the package or entering the barcode number (or other code) manually. The robotic delivery system computer checks with the local database or backend server(s) 512, retrieves an identification of the deposit location within the package staging site in which the package is present, and displays the location to the agent.

At 508, the agent manually removes the package from the deposit location identified at 506. Subsequently, the agent may take any of a variety of actions with respect to the package, including causing it to be returned to sender, delivering the package to the intended recipient via normal channels (e.g., postal carrier), or storing the package in a different location for later delivery or pickup by the intended recipient.

At 510, the agent confirms via the robotic delivery system computer that the package has been removed, e.g., by activating a real or virtual button.

At 512, the robotic delivery system sends a time expired/last mile removal message to the backend server(s) 512. In response, the backend server may update tracking information and/or send a message to the intended recipient as to the whereabouts of the package.

Note that, according to alternative embodiments of technique 500, the deposit location may be equipped with indicators, e.g., LEDs, that signal when a package should be removed due to time expiration. According to such embodiments, the log-in process of 502 and 504 may be omitted or may be optional.

Figure 6:
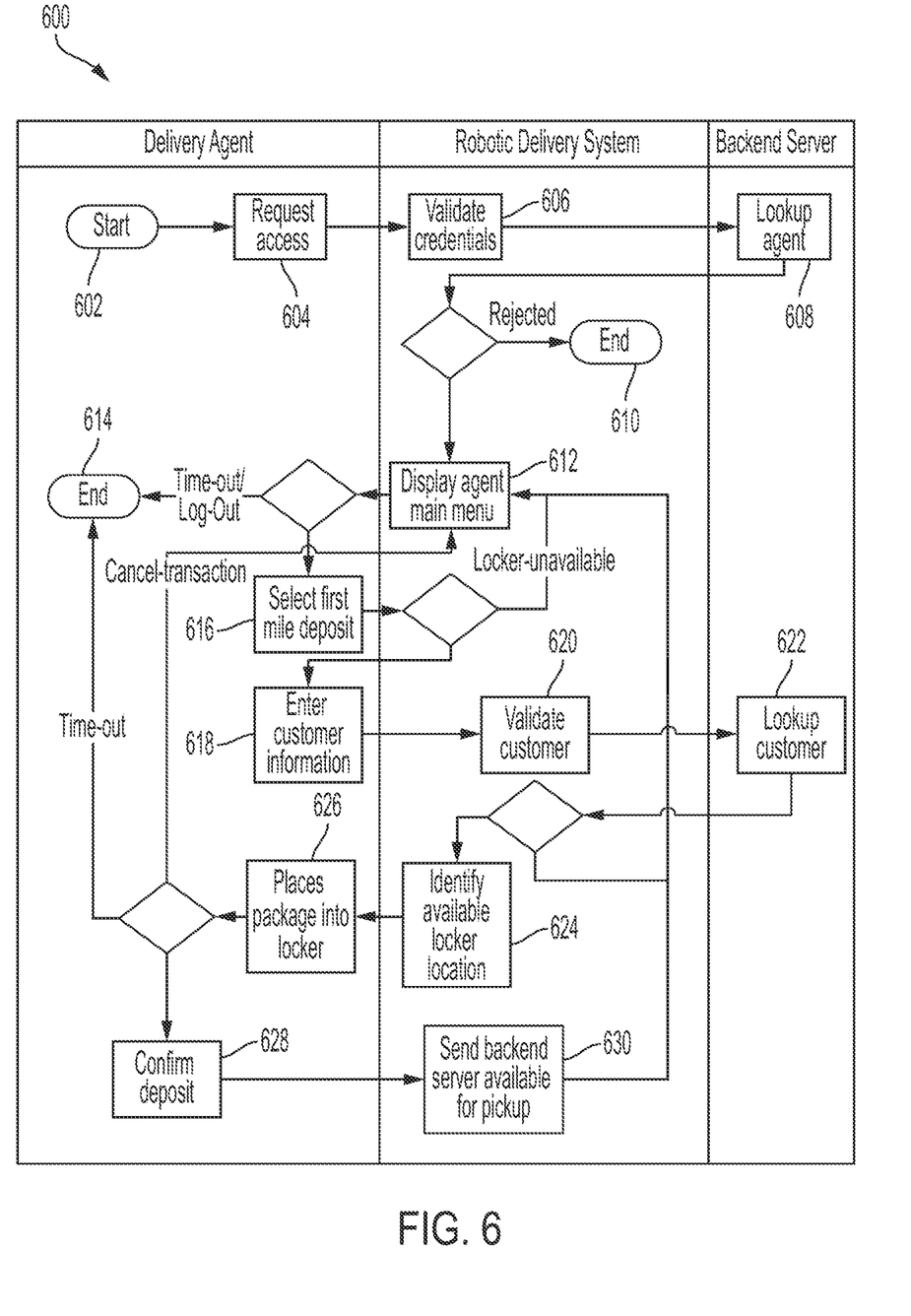
FIG. 6 is a flow chart of a technique for agent deposition of a package with the robotic delivery system according to various embodiments.

FIG. 6 is a flow chart of a technique 600 for agent deposition of a package with the robotic delivery system according to various embodiments. Technique 600 may be implemented in part by a robotic delivery system, an example part of which is shown and described in reference to FIG. 1. Technique 600 includes activities performed by the robotic delivery system when implementing the actions of technique 200 of FIG. 2 according to some embodiments. Technique 600 may start at 602.

At 604, the agent requests access to the robotic delivery system, e.g., by logging in at a robotic delivery system computer. To log in, the agent enters their identification and a password according to some embodiments. According to some embodiments, three factor authentication is used, e.g., the agent provides their identification, a password, and a third datum, such as an output of a smart dongle or a scan of a physical barcode associated with the agent.

At 606 the robotic delivery system validates the agent's credentials. To do so, the robotic delivery system computer conveys the credentials to an electronic lookup agent at the backend server(s) at 608. Such a backend server may be communicatively coupled to, and remotely located from, a plurality of robotic delivery system computers and publicly-accessible customer terminals. The backend server responds with a message indicating whether the validation was successful or unsuccessful. If unsuccessful, the technique may terminate at 610. Otherwise, control passes to 612.

At 612, the customer terminal of the robotic delivery system displays a main menu. If the agent does nothing, after a period of inactivity (or if the user so selects) the system logs them out at 614. Otherwise, the agent selects an option to deposit a package at 616. In embodiments where there are multiple sizes of deposit locations available and the robotic delivery system is not already aware of the size of the package, the agent may enter the size of the package or select the size of the deposit location needed.

At 618, the agent provides customer identification information to the system. To do so, the agent may scan a barcode (or other code) present on the package using a scanner communicatively coupled to (or included in) the robotic delivery system computer. The barcode may have been affixed to the package as it entered the system of the package delivery service or at a different time via a different technique. The robotic delivery system computer validates the customer information at 620 by sending it to a customer lookup process 622 at the backend server, which compares it to the expected location of the package, for example, as obtained from the backend server. If invalid, the system notifies the agent and then control reverts to 612. Otherwise, control passes to 624.

At 624, the system identifies a deposit location within the package staging site that is unoccupied. To do so, the robotic delivery system may maintain an electronic log of which deposit locations include packages and which do not. The electronic log may be in the form of a database in or accessible by the robotic delivery system computer. The robotic delivery system computer identifies an unoccupied deposit location and displays an identification of the unoccupied deposit location to the agent.

At 626, the agent places the package in the deposit location of the package staging site that was identified at 624. The agent may manually place the package on a shelf corresponding to the identified deposit location according to some embodiments. According to alternative embodiments, the system may convey the package to the shelf corresponding to the identified deposit location automatically, e.g., using the robot, and in such embodiments, displaying of the unoccupied deposit location in 624 may be skipped. If the agent does not place the package on a shelf and then cancels the transaction at the robotic delivery system computer, then control passes back to 612, where the robotic delivery system computer displays a main menu. If the agent takes too long, or the process otherwise times out at the robotic delivery system computer, then control passes to 614, and the process ends.

Otherwise, the agent confirms deposit of the package at 628. The agent may do so via the robotic delivery system computer. According to some embodiments, instead of, or in addition to the agent confirming deposit of the package via the robotic delivery system computer, the deposit location may include a sensor that provides an indication of whether a package is present therein or not. Such a sensor may be a weight sensor, a light sensor, a sound sensor, etc., and may be communicatively coupled to the robotic delivery system computer to indicate that the package has been properly deposited.

At 630, the robotic delivery system computer sends an available-for-pickup message to the robotic delivery system, e.g., to the backend server. The backend server may subsequently contact the intended recipient, e.g., via email, text message, or automated phone call, for example, to alert the customer that the package is available for retrieval via the robotic delivery system.

Figure 7:
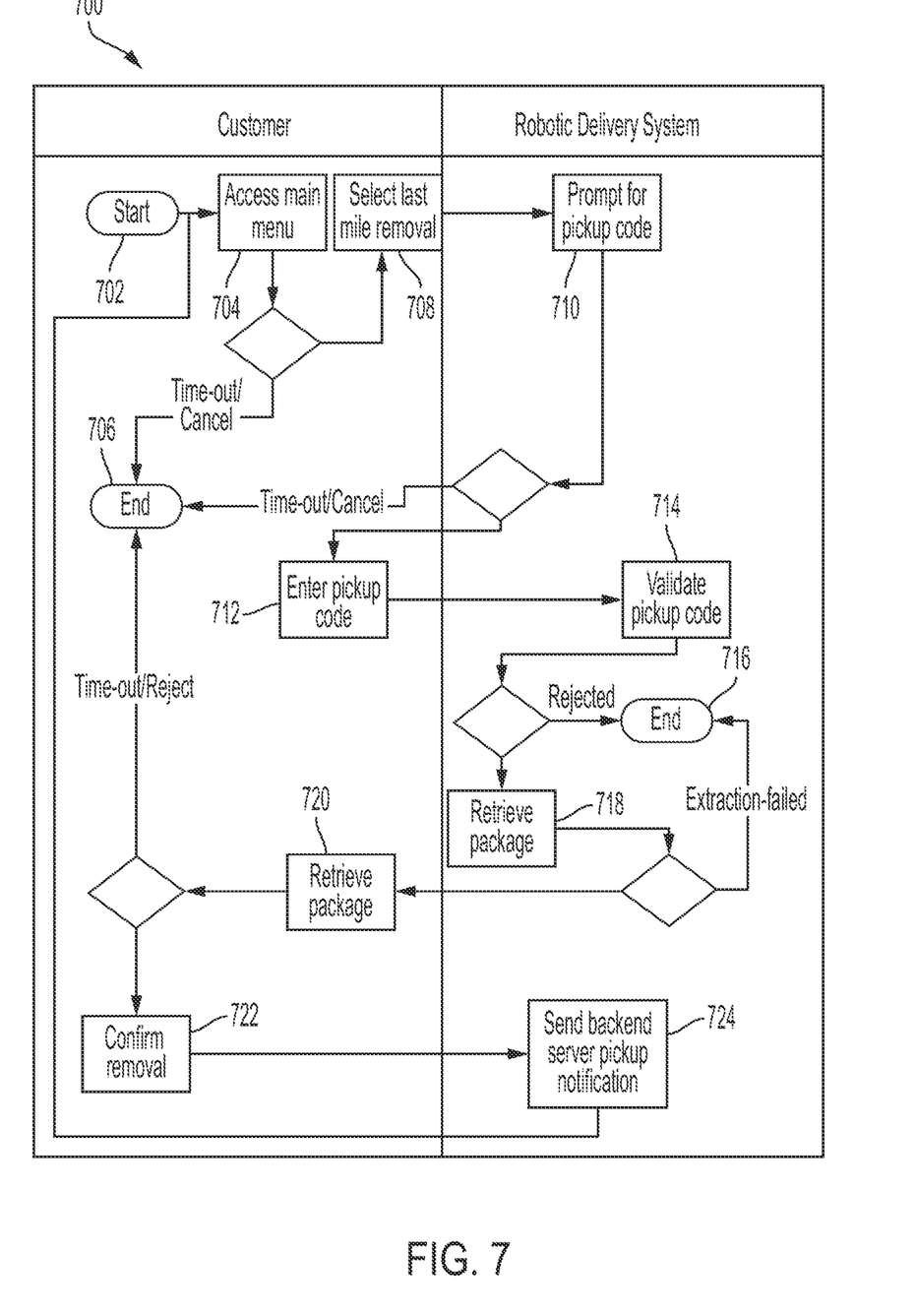
FIG. 7 is a flow chart of a technique for customer removal of a package from the robotic delivery system according to various embodiments.

FIG. 7 is a flow chart of a technique 700 for customer removal of a package from the robotic delivery system according to various embodiments. Technique 700 may be implemented in part by a robotic delivery system, an example part of which is shown and described in reference to FIG. 1. Technique 700 includes activities taken by the robotic delivery system when implementing the actions of technique 300 of FIG. 3 according to some embodiments. Technique 700 starts at 702.

At 704, the customer accesses a main menu at a publicly-accessible customer terminal of the robotic delivery system. The customer terminal may be proximate to the publicly-accessible side of the customer interface repository. If the customer takes too long or the process otherwise times out, then control passes to 706 and the process ends.

Otherwise, at 708, the customer selects an option to pick up a package, also known as "last mile removal". At 710, the customer terminal prompts the customer to provide a package code. The package code may be a barcode, a number encoded therein, or some other code or credential known to the customer. The customer may obtain the code from the package delivery service via email, post card, text message, package tracking website, or any other communication channel. The code may be associated with the package when the package enters the robotic delivery system or when the package is first recognized by the delivery service. If the customer takes too long to enter the package code or the process otherwise times out, then control passes to 706, where the process ends. Otherwise, if the customer enters the package code at 712 by scanning a barcode or otherwise, then control passes to 714.

At 714, the backend server(s) validates the package code, e.g., by confirming that the package associated with the package code is available for pickup at the present location. The robotic delivery system may check with a package tracking database to so confirm. If the package code is invalid for any reason, then control passes to 716 and technique 700 ends. Otherwise, if the package code is valid, then control passes to 718.

At 718, the robot moves to the package deposit location of the package staging site that is associated with the package code. The robot attempts to extract the package therefrom, e.g., using pincers or a spatula mechanism. According to embodiments that utilize the customer interface repository of FIG. 10, the robot may extract the package by picking up an entire bin, which may contain one or more packages. If the extraction fails for any reason, then control passes to 716 and the process ends. Otherwise, the robot retrieves the package and delivers it to the customer interface repository via the publicly-inaccessible side.

If the customer does not retrieve the package within a predetermined time interval, then control passes to 706, and the process ends. According to some embodiments, before returning to 706, the robot may return the package to the deposit location of the package staging site. Otherwise, the customer retrieves the package from the customer interface repository, specifically, from the publicly-accessible side, at 720.

At 722, the customer confirms that they removed the package. The customer may do so by activating a real or virtual confirmation virtual button on the customer terminal, which may provide confirmation to the system that the package has been removed from the customer interface repository. According to some embodiments, instead of, or in addition to the customer confirming removal of the package via the customer terminal, the customer interface repository may include a sensor that provides an indication of whether a package is present therein or not. Such a sensor may be a weight sensor, a light sensor, a sound sensor, etc., and may be communicatively coupled to the customer terminal to indicate that the package has been removed.

At 724, the robotic delivery system sends a pickup notification to the backend server, which may store data indicating the package has been removed. The backend server may subsequently send a pickup notification message, e.g., to the customer, the sender, and/or to a separate package tracking system. The notification may be sent via email, regular mail, text message, or any other communication channel.

Figure 8:
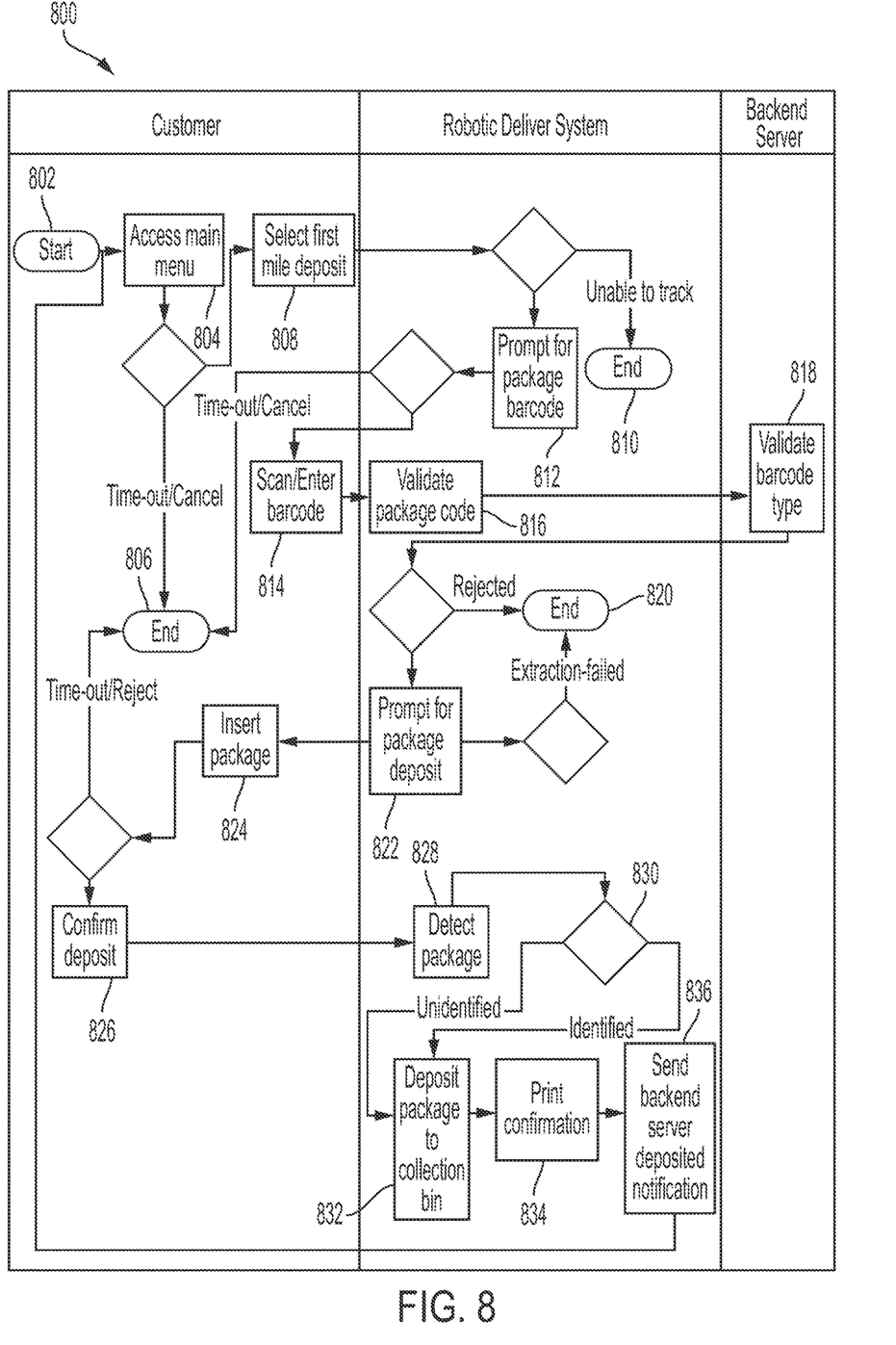
FIG. 8 is a flow chart of a technique for customer deposition of a package with the robotic delivery system according to various embodiments.

FIG. 8 is a flow chart of a technique 800 for customer deposition of a package with the robotic delivery system according to various embodiments. Technique 800 may be implemented in part by a robotic delivery system, an example part of which is shown and described in reference to FIG. 1. Technique 800 includes activities taken by the robotic delivery system when implementing the actions of technique 400 of FIG. 4 according to some embodiments. Technique 800 starts at 802.

At 804, the customer accesses a main menu at a publicly-accessible customer terminal of the robotic delivery system. If the customer takes too long or the process otherwise times out, then control passes to 806 and the process ends.

Otherwise, at 808, the customer selects an option to deposit a package for delivery, also known as "first mile deposit". The customer may do so using a real or virtual button on the customer terminal, for example. If the terminal is unable to load the necessary information, then control may pass to 810 and the process may end.

Otherwise, control passes to 812, where the customer terminal prompts the customer for a package code, which may be in the form of a barcode or other code on the package. The customer may have acquired the barcode and/or package code from any of a variety of channels, such as via a postal meter device or through the customer terminal itself. The customer provides the barcode, or the package code that it represents, at 814.

Next, at 816, the robotic delivery system validates the package code, e.g., by passing it or a representation thereof to the backend server(s). At 818, the backend server validates the package code by confirming that the associated package is in the system by checking its database records, for example, to ensure that the package code is associated with a package for which a delivery fee has been paid. In various embodiments, it may obtain further information about the package for additional validations, for example, the estimated weight. If the package code is invalid, the control passes to 820, and the process ends. Otherwise, control passes to 822.

At 822, the customer terminal prompts the customer to deposit the package through the publicly-accessible side of the customer interface repository. The customer terminal may do so by displaying such a prompt. The customer deposits the package at 824, and at 826 the customer confirms that the package has been deposited, e.g., by activating a real or virtual button on the customer terminal.

At 828, the robotic delivery system confirms that the package has been deposited. To validate the presence of the package, the customer interface repository may include a scale or other weight sensor, a light sensor, a sound sensor, or any other suitable sensor type. The robotic delivery system then, at 830, determines whether the package is identified or unidentified (e.g., if the package weight does not match the weight paid for as represented by the package code). If unidentified, the robotic delivery system may convey the package to a separate bin from the bin in which identified packages are placed, or, in various embodiments, it may return the package to the customer.

At 832, the robotic delivery system transfers the package to a delivery staging location such as a bin. This may be accomplished by the robot of the robotic delivery system conveying the package from the customer interface repository to the delivery staging area.

At 834, the customer terminal prints or otherwise supplies the customer with a receipt indicating that the package has been accepted.

At 836, the robotic delivery system sends a package deposit message to the backend server indicating that the package has entered the system. This information may be used for tracking and/or for customer pickup.

Figure 9:
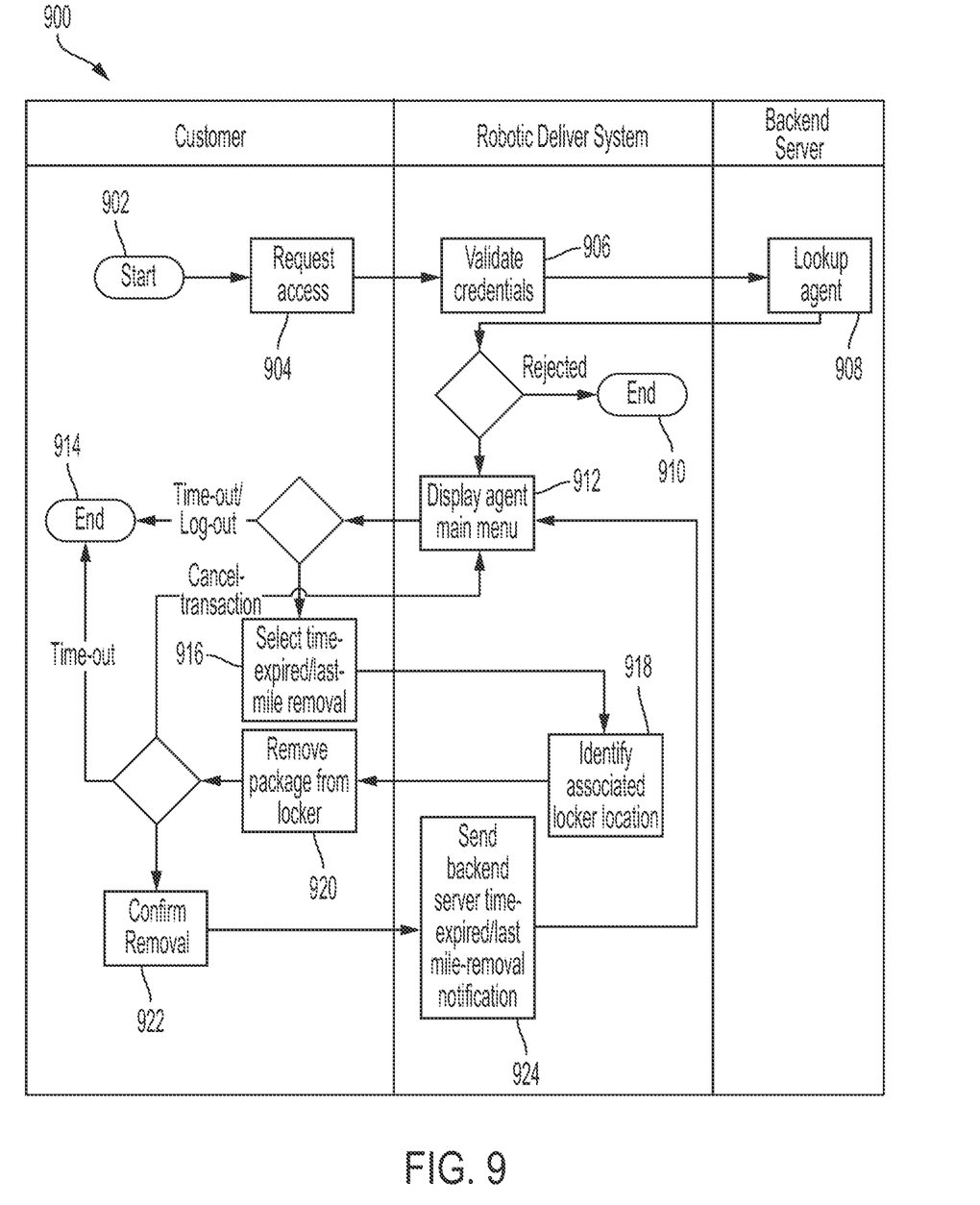
FIG. 9 is a flow chart of a technique for agent removal of a package from the robotic delivery system due to time expiration according to various embodiments.

FIG. 9 is a flow chart of a technique 900 for agent removal of a package from the robotic delivery system due to time expiration according to various embodiments. Technique 900 may be implemented in part by a robotic delivery system, an example part of which is shown and described in reference to FIG. 1. Technique 900 includes activities taken by the robotic delivery system when implementing the actions of technique 500 of FIG. 5 according to some embodiments. Thus, technique 900 may be implemented when a package has been in a deposit location for too long, or when space is needed in the package staging site for newly arriving packages. Technique 900 starts at 902.

At 904, an agent requests access to the robotic delivery system via a robotic delivery system computer, at 906 the robotic delivery system validates the agent's credentials, and at 908, the robotic delivery system computer conveys the credentials to an electronic lookup agent at the backend server(s). These actions are essentially identical to the actions of 604, 606, and 608 of technique 600 of FIG. 6, respectively. Thus, if the validation fails, control passes to 910 and the technique ends. Otherwise, control passes to 912, where the robotic delivery system computer displays a main menu. If the agent does nothing, then the system logs them out after a period of inactivity and the process ends at 914.

Otherwise, the agent selects a time expired/last mile removal option from the robotic delivery system computer at 916. The agent then scans a barcode associated with the package or manually types in the barcode number (or other code) at the robotic delivery system computer. At 918, the robotic delivery system computer retrieves, from a local database in or coupled to the robotic delivery system computer, an identification of a deposit location within the package staging site in which the package is present and displays the location to the agent on the robotic delivery system computer. Alternatively, or in addition, according to some embodiments, the system itself may identify the deposit location, e.g., by illuminating an LED indicator present at the deposit location itself.

At 920, the agent removes the package from the identified deposit location. At 922, the agent confirms that the package has been removed, e.g., by activating a real or virtual button on the robotic delivery system computer. Subsequently, the agent may take any of a variety of actions with respect to the package, including causing it to be returned to sender, delivering the package to the intended recipient via normal channels (e.g., postal carrier), or storing the package in a different location for later delivery or pickup by the intended recipient.

If the agent does not confirm removal within a predetermined amount of time, then the robotic delivery system computer times out and the process ends at 914. Otherwise, control passes to 944.

At 924, the robotic delivery system (e.g., the robotic delivery system computer) sends a message to the backend server that the package has been removed from the robotic delivery system due to time expiration. That is, the message indicates a last mile removal of the package. The backend server may update tracking information and/or send a message to the intended recipient with instructions for acquiring the package.

Figure 10:
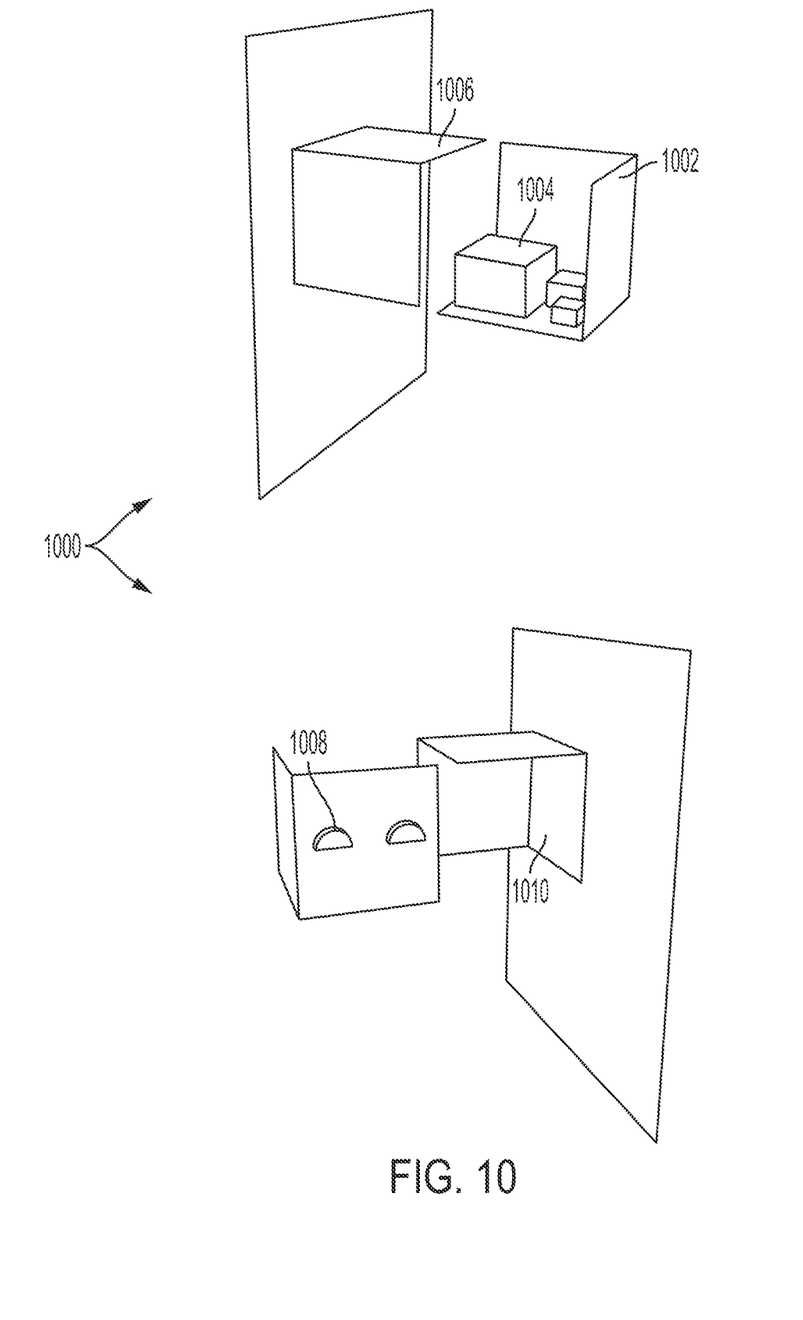
FIG. 10 is a three-dimensional conceptual model of a removable bin assembly 1000 according to some embodiments.

FIG. 10 is a three-dimensional conceptual model of a removable bin assembly 1000 according to some embodiments. According to such embodiments, instead of picking up the packages directly, the robot picks up bin 1002, which contains one or more packages 1004, and brings it to the customer interface repository. Thus, bin 1002 may include robot pickup points 1008 that allow the robot to easily locate, pick up, remove, and handle bin 1002.

As shown in FIG. 10, bin 1002 interfaces with shell 1006, which may form a fixed portion of the wall installation, to form a customer interface repository, e.g., customer interface repository 108 of FIG. 1. When inserted in the through-wall channel of the customer interface repository, bin 1002 may seal on all sides to prevent customer access to the secure area. According to some embodiments, there may be a small lip on the sides of bin 1002 to prevent sliding out and partial insertions of packages. Shell 1006 incorporates or accommodates door 1010, which controls access to the customer interface repository from the publicly-accessible customer area. Door 1010 may be reinforced and controllably locked by the robotic delivery system. In particular, door 1010 may lock unless bin 1002 is fully in place and the interior is encapsulated by shell 1006.

The three-wall design of bin 1002 is particularly advantageous because, when inserted into a shelf, on the opposite side of the shelf to the robot, the area is open so that an agent can quickly and easily load packages. Advantages of removable bin assembly 1000 in general include that it makes the packages effectively regular-sized, with specific and registerable pick-up points for the robot to home in on and grab or otherwise physically interface with. Further, removable bin assembly 1000 prevents loading packages that are too big into the shelves. Yet further, removable bin assembly 1000 allows for multiple packages per customer interface repository.

Alternative designs for bin 1002 include a five-wall design, e.g., for embodiments where the agent also loads packages through the same customer interface repository port, a floor-only design where the robot brings the package in from underneath, and a configuration where the package is dropped in from the side or top.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of automatically providing a package for pickup, the method comprising:
validating credentials provided by an agent;
determining a deposit location within a publicly-inaccessible package staging site that is unoccupied;

providing, at a robotic delivery system computer and to the agent, an identification of the deposit location within the publicly-inaccessible package staging site, whereby the agent drops off the package at the deposit location;

receiving confirmation, at the robotic delivery system computer, and using a combination of sensors at the deposit location within the publicly-inaccessible package staging site, that the package has been deposited by the agent at the deposit location within the publicly inaccessible package staging site;

receiving, at a publicly-accessible terminal, a code associated with the package;

validating the code with data in a database communicatively coupled to the publicly-accessible terminal;

retrieving the package, by a robot communicatively coupled to the publicly-accessible terminal, from the publicly-inaccessible package staging site;

delivering the package, by the robot, to a customer interface repository, wherein the customer interface repository comprises a shell affixed to a wall separating the package staging site from the publicly-accessible terminal, wherein surfaces of the shell consist of a top surface and a single side surface, wherein the robot delivers the package by joining a bin to the shell, and wherein surfaces of the bin consist of a rear surface, a bottom surface, and a single side surface;

obtaining confirmation that the package has been removed from the customer interface repository; and storing data, by at least one server, indicating the package has been removed.

2. The method of claim 1, further comprising, prior to the receiving the code associated with the package:

sending electronically a notification that the package is available for pick up.

3. The method of claim 1, further comprising, prior to the receiving the code associated with the package, and at a location different from a location of the publicly-accessible terminal:

receiving, at a second publicly-accessible terminal, a second code associated with the package;

validating, by the at least one server, the second code;

delivering a prompt, by the second publicly-accessible terminal, to deposit the package;

determining that the package has been deposited at a second customer interface repository; and storing data, by the at least one server, indicating the package has been accepted.

4. The method of claim 3, further comprising transferring, by a second robot at the location different from the location of the publicly-accessible terminal, the package to a delivery staging location.

5. The method of claim 1, further comprising:

receiving, at the robotic delivery system computer, an indication of an intent to remove a second package from the package staging site;

providing, at the robotic delivery system computer, an identification of a second deposit location within the package staging site;

receiving confirmation, at the robotic delivery system computer, that the second package has been removed from the second deposit location within the package staging site; and sending electronically a notification that the second package has been removed from the second deposit location.

6. The method of claim 1, wherein the robot is installed on a track that provides positions of access to the customer interface repository and to the deposit location.

7. The method of claim 1, wherein the package staging site comprises a plurality of deposit locations for each of a plurality of packages.

8. The method of claim 1, wherein the receiving the code associated with the package comprises scanning a barcode.

9. The method of claim 1, wherein the package is provided to an autonomous delivery device.

10. The method of claim 1, wherein the bin comprises at least one registerable robot pick-up point.

11. A system for automatically providing a package for pickup, the system comprising:

a combination of sensors at a deposit location within a publicly-inaccessible package staging site;

a robotic delivery system computer communicatively coupled to the combination of sensors and configured to validate credentials provided by an agent, determine a deposit location within a publicly-inaccessible package staging site that is unoccupied, provide to the agent an identification of the deposit location within the package staging site, whereby the agent drops off the package at the deposit location, and receive confirmation, using the combination of sensors, that the package has been deposited by the agent at the deposit location within the publicly-inaccessible package staging site;

a publicly-accessible terminal configured to receive a code associated with the package;

at least one electronic processor communicatively coupled to the terminal and configured to validate the code with data in a database communicatively coupled to the publicly-accessible terminal;

a robot communicatively coupled to the publicly-accessible terminal and configured to retrieve the package from a publicly-inaccessible package staging site and deliver the package to a customer interface repository, wherein the customer interface repository comprises a shell affixed to a wall separating the package staging site from the publicly-accessible terminal, wherein surfaces of the shell consist of a top surface and a single side surface, wherein the robot is configured to deliver the package by joining a bin to the shell, wherein surfaces of the bin consist of a rear surface, a bottom surface, and a single side surface, wherein the at least one electronic processor is further communicatively coupled to the robot, and wherein the at least one electronic processor is further configured to obtain confirmation that the package has been removed from the customer interface repository; and at least one server communicatively coupled to the at least one electronic processor and configured to store data indicating the package has been removed.

12. The system of claim 11, wherein the robotic delivery system computer is further configured to send electronically a notification that the package is available for pick up.

13. The system of claim 11, further comprising a second publicly-accessible terminal configured to receive, prior to the publicly accessible terminal receiving the code associated with the package, a second code associated with the package, wherein the second publicly-accessible terminal is at a location different from a location of the publicly-accessible terminal;

wherein the at least one electronic processor is configured to validate the second code;

wherein the second publicly-accessible terminal is further configured to deliver a prompt to deposit the package;

wherein the system further comprises at least one sensor configured to determine that the package has been deposited at a second customer interface repository; and wherein the at least one server is further configured to store data indicating the package has been accepted.

14. The system of claim 13, further comprising a second robot at the location different from the location of the publicly-accessible terminal configured to transfer the package to a delivery staging location.

15. The system of claim 11, wherein the robotic delivery system computer is further configured to receive an indication of an intent to remove a second package from the package staging site, provide an identification of a second deposit location within the package staging site, receive confirmation that the second package has been removed from the second deposit location within the package staging site, and send electronically a notification that the second package has been removed from the second deposit location.

16. The system of claim 11, wherein the robot is installed on a track that provides positions of access to the customer interface repository and to the deposit location.

17. The system of claim 11, wherein the package staging site comprises a plurality of deposit locations for each of a plurality of packages.

18. The system of claim 11, wherein the publicly-accessible terminal comprises a barcode scanner configured to obtain the code associated with the package.

19. The system of claim 11, wherein the package is provided to an autonomous delivery device.

20. The system of claim 11, wherein the bin comprises at least one registerable robot pick-up point.

* * * * *